US006977879B1

(12) United States Patent
Hamada et al.

(10) Patent No.: US 6,977,879 B1
(45) Date of Patent: *Dec. 20, 2005

(54) APPARATUS FOR ADJUSTING PHASE OF CLOCK SIGNAL BASED ON PHASE ERROR CALCULATED FROM SAMPLED VALUES OF READOUT SIGNAL

(75) Inventors: Kenichi Hamada, Kawasaki (JP); Satoshi Furuta, Kawasaki (JP); Masakazu Taguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 807 days.

This patent is subject to a terminal disclaimer.

(21) Appl. No.: 09/656,692

(22) Filed: Sep. 7, 2000

(30) Foreign Application Priority Data

Dec. 20, 1999 (JP) .................................. 11-361550

(51) Int. Cl.[7] ............................................. G11B 20/18
(52) U.S. Cl. .................................................. 369/53.34
(58) Field of Search ..................................... 369/53.34

(56) References Cited

U.S. PATENT DOCUMENTS

| 5,258,933 A |   | 11/1993 | Johnson et al. ............. 364/602 |
|---|---|---|---|
| 5,572,558 A |   | 11/1996 | Beherns ....................... 375/376 |
| 5,663,942 A | * | 9/1997 | Ishibashi et al. .......... 369/53.34 |
| 5,675,565 A | * | 10/1997 | Taguchi et al. ........... 369/47.35 |
| 5,742,576 A | * | 4/1998 | Hayashi et al. ........... 369/59.21 |
| 5,777,967 A | * | 7/1998 | Ishibashi et al. ........... 369/59.2 |
| 5,808,573 A |   | 9/1998 | Shih et al. .................. 341/110 |
| 5,892,474 A |   | 4/1999 | Sugawara ................... 341/200 |
| 5,914,924 A | * | 6/1999 | Takagi et al. ............. 369/44.35 |
| 5,978,335 A | * | 11/1999 | Clark et al. .............. 369/53.34 |
| 5,987,082 A | * | 11/1999 | Fujimoto ..................... 375/355 |
| 6,028,902 A | * | 2/2000 | Kiyanagi et al. ........... 375/355 |
| 6,097,685 A | * | 8/2000 | Yamaguchi et al. ...... 369/59.22 |
| 6,151,282 A | * | 11/2000 | Hamada et al. .......... 369/59.19 |
| 6,181,751 B1 | * | 1/2001 | Sun ............................. 375/340 |
| 6,215,751 B1 | * | 4/2001 | Tsuchinaga .............. 369/47.35 |
| 6,278,749 B1 | * | 8/2001 | Jeon .......................... 375/341 |
| 6,304,538 B1 | * | 10/2001 | Hayashi ................... 369/59.22 |
| 6,499,662 B1 | * | 12/2002 | Coleman et al. ....... 235/462.18 |
| 6,542,039 B1 | * | 4/2003 | Ogura .......................... 331/11 |
| 6,560,053 B1 | * | 5/2003 | Ohta et al. .................... 360/51 |

FOREIGN PATENT DOCUMENTS

| EP | 316 459 | 5/1989 |
|---|---|---|
| JP | 56160175 | 12/1981 |
| JP | 57141137 | 9/1982 |
| JP | 63286090 | 11/1988 |
| JP | 7050697 | 2/1995 |
| JP | 7111662 | 4/1995 |
| JP | 09-007304 | 1/1997 |
| JP | 11-328874 | 11/1999 |
| WO | 97/09790 | 3/1997 |

* cited by examiner

*Primary Examiner*—A M Psitos
(74) *Attorney, Agent, or Firm*—Greer, Burns & Crain, LTD

(57) ABSTRACT

A clock adjustment apparatus for adjusting a phase of a clock signal based on a phase error thereof is provided in a data reproduction system which samples a readout signal from a recording medium in synchronism with the clock signal, and reproduces data in accordance with a Viterbi algorithm by using sampled values of the readout signal. The recording medium is recorded with the data modulated in accordance with a recording rule of a predetermined partial response characteristic. The clock adjustment apparatus includes a phase error calculation circuit which calculates the phase error of the clock signal based on the sampled values of the readout signal.

20 Claims, 11 Drawing Sheets

APPARATUS FOR ADJUSTING PHASE OF CLOCK SIGNAL BASED ON PHASE ERROR CALCULATED FROM SAMPLED VALUES OF READOUT SIGNAL

BACKGROUND OF THE INVENTION

1. Field of the Invention

The present invention generally relates to clock adjustment apparatus for data reproduction systems and apparatus having data reproduction systems including such clock adjustment apparatus, and more particularly, to a clock adjustment apparatus for a data reproduction system of a data recording apparatus such as an optical disk apparatus, a magneto-optical disk apparatus or a magnetic disk apparatus, and an apparatus having a data reproduction system including such a clock adjustment apparatus. A magneto-optical disk apparatus, for example, requires an increasingly high recording density of a recording medium, and therefore, needs a data recording/reproduction method with higher accuracy. Adopted as one of such methods is a combination of recording data modulated to a partial response (PR) waveform onto a magneto-optical disk and sampling a readout signal from the magneto-optical disk at a predetermined sampling frequency so as to detect maximum likelihood data through, what is called, the Viterbi decoding detection (or the maximum likelihood sequence estimation: MLSE). Hereinafter, this combination method is referred to as a PRML method.

With respect to the PRML method, it is important to provide phase compensation so that a quantized readout signal can be sampled in synchronism with a clock signal.

2. Description of the Related Art

Regarding a data reproduction system for reproducing recorded data in accordance with the Viterbi algorithm from sampled values obtained by sampling readout data from a recording medium in synchronism with a clock signal, it is necessary to adjust the phase of the clock signal so that the best sampled values can be obtained.

A conventional clock adjustment apparatus for the data reproduction system estimates the phase error of the clock signal by using a value (for example, a center value of the readout signal) calculated in the process of reproducing recorded data through the Viterbi algorithm so as to control the phase of the clock signal by using the phase error.

According to such a conventional clock adjustment apparatus, the overall structure of the data reproduction system including the clock adjustment apparatus can be simplified.

On the other hand, the above-described data reproduction system requires a higher-speed clock signal because of a higher recording density of the recording medium.

However, the conventional clock adjustment apparatus, which estimates the phase error of the clock signal by using the processed readout data through the Viterbi algorithm, has difficulty in obtaining such a higher-speed clock signal necessary to guarantee the sampling of the readout signal at the right phase.

SUMMARY OF THE INVENTION

It is a general object of the present invention to provide a clock adjustment apparatus for a data reproduction system and an apparatus having a data reproduction system including such a clock adjustment apparatus in which the above disadvantages are eliminated.

A more specific object of the present invention is to provide a clock adjustment apparatus for a data reproduction system, which clock adjustment apparatus produces a clock signal fast enough to guarantee sampling of a readout signal at the right phase, and an apparatus having a data reproduction system including such a clock adjustment apparatus.

The above-mentioned objects of the present invention are achieved by a clock adjustment apparatus for adjusting a phase of a clock signal based on a phase error thereof in a data reproduction system which samples a readout signal from a recording medium in synchronism with the clock signal, and reproduces data in accordance with a Viterbi algorithm by using sampled values of the readout signal, the recording medium being recorded with the data modulated in accordance with a recording rule of a predetermined partial response characteristic, the clock adjustment apparatus including a phase error calculation circuit calculating the phase error of the clock signal based on the sampled values of the readout signal.

According to the above-mentioned data reproduction system, the waveform of the readout signal from the recording medium depends on the predetermined PR characteristic. When such a readout signal is sampled in synchronism with the clock signal of the right phase, the transition state of the sampled values also depends on the PR characteristic. Therefore, the phase error of the clock signal can be obtained based on the extent of the difference between the transition state of the sampled values obtained in synchronism with the clock signal and the transition state of expected sampled values corresponding to the PR characteristic.

The above-mentioned objects of the present invention are also achieved by a clock adjustment apparatus for adjusting a phase of a clock signal based on a phase error thereof in a data reproduction system which samples a readout signal from a recording medium in synchronism with the clock signal, and reproduces data in accordance with a Viterbi algorithm by using sampled values of the readout signal, the recording medium being recorded with the data modulated in accordance with a recording rule of a predetermined partial response characteristic, the clock adjustment apparatus including a phase error calculation circuit calculating the phase error of the clock signal based on a transition state of the sampled values of the readout signal before undergoing the Viterbi algorithm.

The above-mentioned objects of the present invention are further achieved by an apparatus including a data reproduction system which samples a readout signal from a recording medium in synchronism with a clock signal, and reproduces data in accordance with a Viterbi algorithm by using sampled values of the readout signal, said recording medium being recorded with the data modulated in accordance with a recording rule of a predetermined partial response characteristic, the data reproduction system having a clock adjustment circuit including a phase error calculation circuit calculating a phase error of the clock signal based on the sampled values of the readout signal, and adjusting a phase of the clock signal based on the phase error.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

A description will now be given, with reference to the accompanying drawings, of an embodiment of the present invention.

Figure 1:
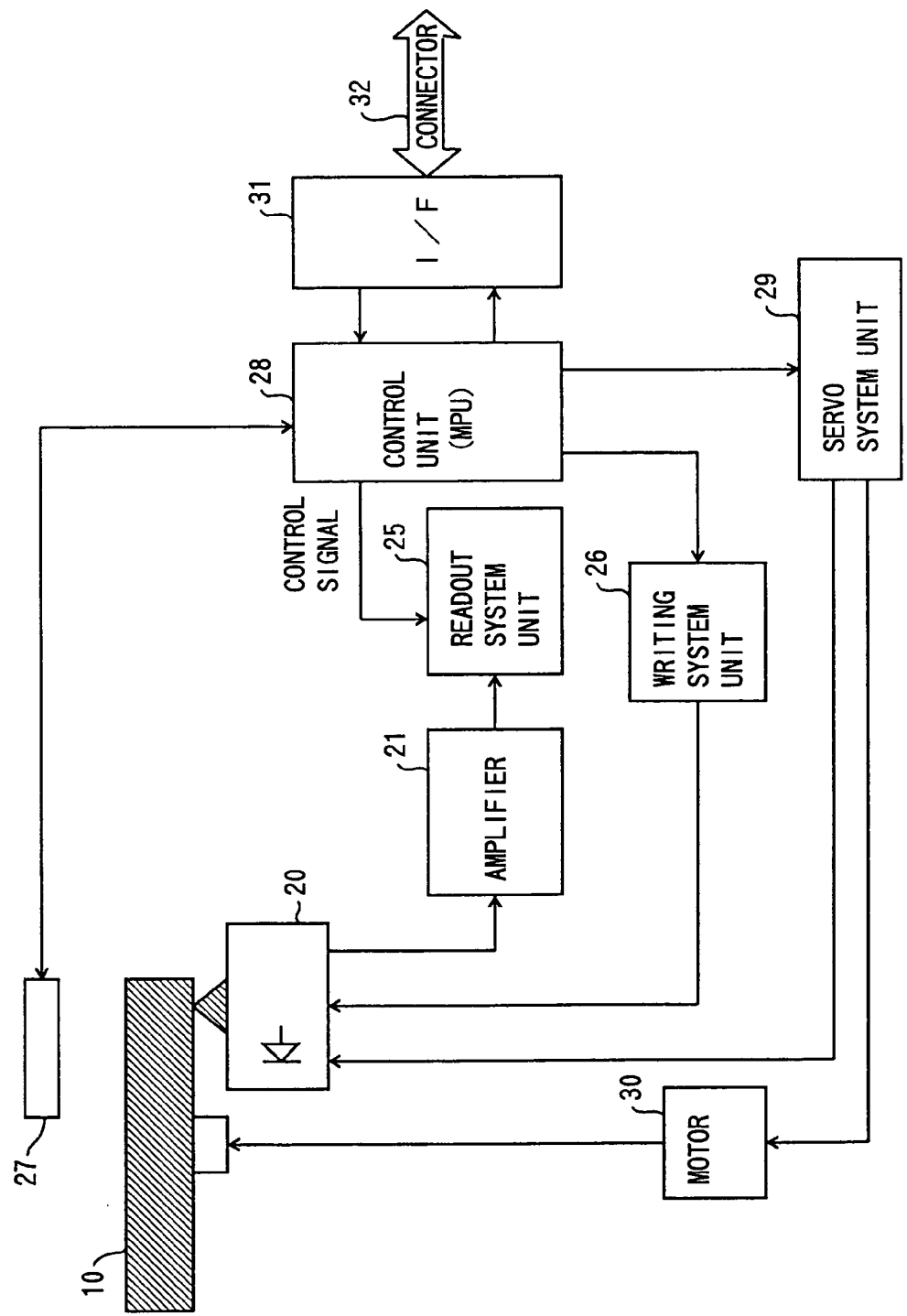
FIG. 1 is a block diagram showing a structure of an optical disk apparatus according to an embodiment of the present invention.

FIG. 1 shows a structure of an optical disk apparatus according to the embodiment of the present invention. The optical disk apparatus is a magneto-optical disk apparatus employing a magneto-optical disk as a recording medium.

According to FIG. 1, the magneto-optical disk apparatus includes a magneto-optical disk 10 serving as a recording medium, an optical head 20, an amplifier 21, a readout system unit 25, a writing system unit 26, an electromagnet 27, a control unit (MPU) 28, a servo system unit 29, and a motor 30. Data is recorded on the magneto-optical disk 10 in accordance with the recording rule of a predetermined PR characteristic (for example, the PR (1, 1) of a constraint length 2), and is reproduced from the magneto-optical disk 10.

The MPU 28 controls the readout system unit 25, the writing system unit 26 and the servo system unit 29 in accordance with a data readout command and a data writing command provided from an external unit (not shown) through a connector 32 and an interface circuit 31. A description will be given later of the control of the MPU 28 over the readout system unit 25.

According to the above-described magneto-optical disk apparatus, the optical head 20 optically scans the magneto-optical disk 10 when the data readout command is provided thereto, so that a readout signal output from the optical head 20 is provided to the readout system unit 25 through the amplifier 21. The readout system unit 25 quantizes the provided readout signal and generates output data from the quantized data in accordance with a maximum likelihood (ML) decoding algorithm (for example, the Viterbi algorithm). The output data is provided to the MPU 28 and is further output therefrom to the external unit through the interface circuit 31 and the connector 32.

On the other hand, when the MPU 28 receives the data writing command as well as data to be recorded from the external unit, the MPU 28 modulates the data in accordance with the predetermined recording rule (for example, the PR (1, 1)), and provides the modulated data to the writing system unit 26. The writing system unit 26 controls the operation of the optical head 20 in accordance with the modulated data, and the MPU 28 controls the electromagnet 27 in accordance with data obtained from the modulation of the data. As a result, the data is written on the magneto-optical disk 10 in accordance with the above-mentioned predetermined recording rule.

The servo system unit 29, which is controlled by the MPU 28, actuates the motor 30 so as to rotate the magneto-optical disk 10 at a predetermined speed, and positions the optical head 20 at the recording/reproduction position of the magneto-optical disk 10.

Figure 2:
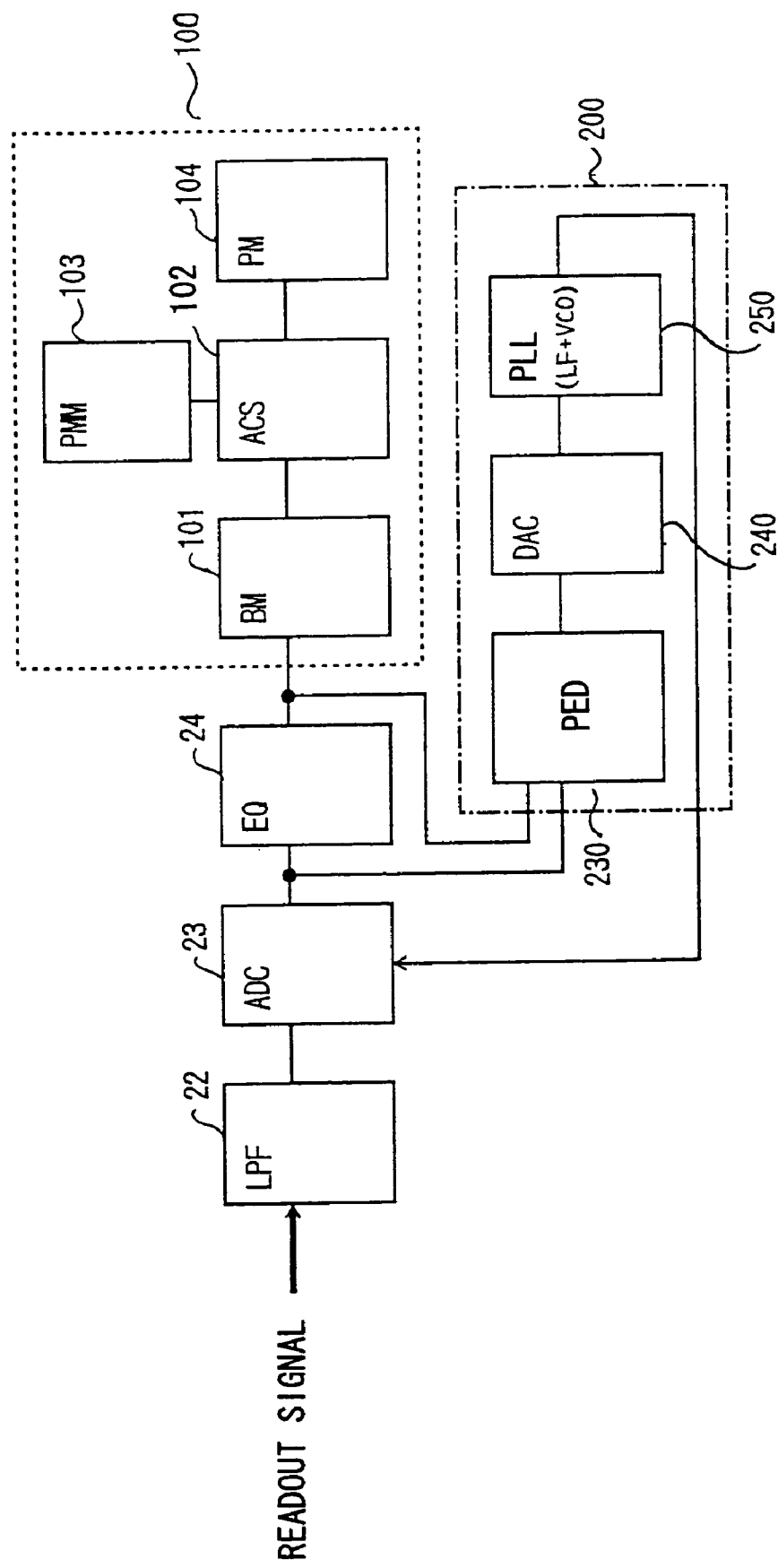
FIG. 2 is a block diagram showing a structure of a readout system unit of the optical disk apparatus of FIG. 1.

FIG. 2 shows a structure of the above-described readout system unit 25.

According to FIG. 2, the readout system unit 25 includes a low-pass filter (LPF) 22, an analog-to-digital converter (ADC) 23, a digital equalizer (EQ) 24, a Viterbi detection module 100, and a clock generation circuit 200.

The readout signal amplified by the amplifier 21 shown in FIG. 1 is subjected to waveform shaping at the LPF 22. The analog readout signal output by the LPF 22 is sampled periodically by the ADC 23. The ADC 23 converts the readout signal into a digital-form readout signal in synchronism with a clock signal supplied from the clock generation circuit 200. In other words, the above-mentioned readout signal is quantized by being sampled by the ADC 23 operating in synchronism with the clock signal.

The ADC 23 continuously samples the readout signal in synchronism with the clock signal generated from the clock generation circuit 200, and outputs the digitized readout signal. The EQ 24 performs waveform equalization on the sampled values of the digitized readout signal, so that the sampled values are output as equalized output data (quantized data). The equalized output data from the EQ 24 is provided to the Viterbi detection module 100 in synchronism with the above-mentioned clock signal. The Viterbi detection module 100 detects, in accordance with the Viterbi algorithm, the recorded data from the equalized output data provided in synchronism with the clock signal, and outputs the recorded data as reproduced data. In the data reproduction system of FIG. 1, the EQ 24 and the Viterbi detection module 100 also operate in synchronism with the clock signal supplied by the clock generation circuit 200, although this is not indicated in FIGS. 1 and 2.

Like generally used Viterbi detectors, the above-mentioned Viterbi detection module 100 includes a branch metric calculation unit (BM) 101, an add-compare-select unit (ACS) 102, a path metric memory (PMM) 103, and a path memory (PM) 104.

The BM 101 calculates branch metrics which corresponds to the differences between sampled values and expected values which the readout signal should take depending on the PR characteristic. The ACS 102 adds previously calculated path metrics stored in the PMM 103 to the corresponding above-mentioned branch metrics. The ACS 102 then compares each given pair of the calculated path metrics so as to select the smaller of the two. The selected path metrics are stored in the PMM 103 as new path metrics. According to the above-described calculation, a path metric is expressed as an addition of branch metrics.

Selecting the smaller path metric as described above corresponds to selecting a state transition path in the Viterbi algorithm. That is to say, the ACS 102 always selects a path so as to minimize the path metric. The ACS 102 supplies the PM 104 with binary data corresponding to the path selected in the above-described way. In the PM 104 data corresponding to each of the selected paths is shifted, while discarding data corresponding to each of non-selected paths. As a result, data corresponding to each of the surviving paths is output from the PM 104 as output data. Thus, the data recorded with high density on the magneto-optical disk 10 can be reproduced with high accuracy by recording the data in a PR waveform and detecting the maximum likelihood data by the Viterbi detection module 100.

The above-mentioned clock generation circuit 200, serving as a feedback loop, includes a phase error detection unit (PED) 230 serving as a means for detecting a phase error, a digital-to-analog converter (DAC) 240 and a phase-locked loop (PLL) 250.

As will be described later, the PED 230 detects the phase error of the above-mentioned clock signal on the basis of the sampled values of the digitized readout signal obtained before undergoing the Viterbi detection module 100. First sampled values S1, which are quantized by the ADC 23 but not subjected to the waveform equalization performed by the EQ 24, and second sampled values S2, on which the waveform equalization is performed by the EQ 24, are provided to the PED 230 in order to detect the phase error of the clock signal.

The phase error of the clock signal detected by the PED 230 is converted into a corresponding voltage level (an analog value) by the DAC 240. The PLL 250, which includes a loop filter (LF) and a voltage-controlled oscillator (VCO), controls the phase of the clock signal so as to reduce the phase error, based on the corresponding voltage level provided from the DAC 240. The clock signal, of which the phase is adjusted by the PLL 250, is provided to the ADC 23 sampling the readout signal.

Figure 3:
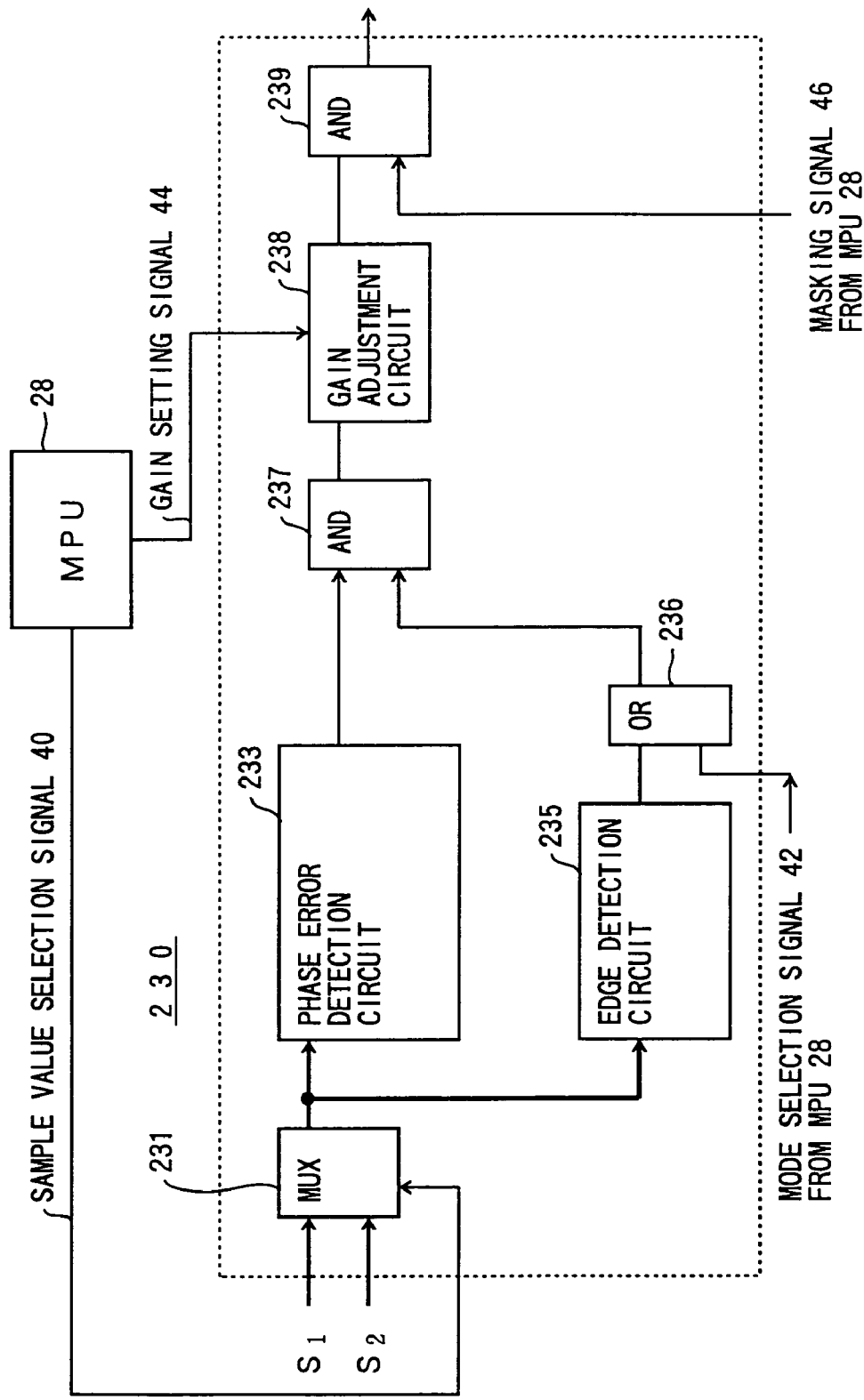
FIG. 3 is a block diagram showing a structure of a phase error detection unit of the readout system unit of FIG. 2.

FIG. 3 is a block diagram showing a structure of the PED 230 shown in FIG. 2. Also shown in FIG. 3 is the above-described MPU 28 inputting a plurality of control signals to the PED 230.

The PED 230 operates in two detection (operation) modes, namely, an acquisition mode and a tracking mode, to detect the phase error of the clock signal. The acquisition mode is an initial adjustment mode, where the phase of the clock signal is adjusted, by using a VFO region arranged on a leading portion of each of the tracks of the magneto-optical disk 10, so that the sampling of the readout signal is properly performed. In the acquisition mode, it is preferable to adjust the phase of the clock signal quickly by setting a gain to a high (Hi) state. A continuous repeat pattern modulated in accordance with the PR characteristic is recorded on the above-mentioned VFO region, and the phase error of the clock signal can be reduced by adjusting the phase thereof in accordance with the repeat pattern.

On the other hand, in the tracking mode, the phase error is gradually controlled by setting the gain to a low (Low) state after the phase of the clock signal is adjusted in the acquisition mode to reduce the phase error. The tracking mode is employed in a data recording (DATA) region, on which is recorded a data signal obtained by modulating desired data in accordance with the PR characteristic.

The PED 230 includes a multiplexer (MUX) 231, a phase error detection (calculation) circuit 233, an edge detection circuit 235, an OR circuit 236, an AND circuit 237, a gain adjustment circuit 238, and an AND circuit 239. The PED 230 detects the phase error of the clock signal in accordance with the control signals input from the MPU 28.

The first and second sampled values S1 and S2 output successively after being digitized in the ADC 23 and equalized in the EQ 24, respectively, are input to the MUX 231. The MPU 28 inputs a sampled value selection signal 40 to the MUX 231 so that the MUX 231 outputs the first sampled values S1 in the acquisition mode and the second sampled values S2 in the tracking mode. In the tracking mode, by employing the equalized second sampled values S2, the phase error of the clock signal can be calculated based on the sampled values of the readout signal having a waveform closer to that to be reproduced. The MPU 28 inputs to the OR circuit 236 a mode selection signal 42 "1" when the phase error is output at all the sampling instants and a mode selection signal 42 "0" when the phase error is output only at edge portions of the data signal. Thus, the MPU 28 serves as an operation mode switching circuit.

The phase error detection circuit 233 calculates the phase error of the clock signal in accordance with a below-described predetermined calculation process in the acquisition and tracking modes, and outputs a corresponding signal to the AND circuit 237. The edge detection circuit 235 detects a rising edge portion or a falling edge portion of the recorded data of the readout signal in the tracking mode, and outputs a corresponding signal, which is input to the AND circuit 237 via the OR circuit 236.

The output signals from the phase error detection circuit 233 and the edge detection circuit 235 are supplied to the AND circuit 237. The AND circuit 237 produces an output signal corresponding to the supplied signals, and outputs the corresponding signal to the gain adjustment circuit 238. At this point, the MPU 28 inputs a gain setting signal 44 to the gain adjustment circuit 238 so that the gain is set to the Hi state in the case of the acquisition mode and to the Low state in the case of the tracking mode. That is, the MPU 28 switches the states of the gain, serving as a gain switching circuit.

The PED 230 generally operates as follows. First, in the acquisition mode, the first sampled values S1 are input to the phase error detection circuit 233 via the MUX 231. The phase error detection circuit 233 calculates the phase error of the clock signal from the first sampled values S1 in accordance with the predetermined calculation process, and outputs the corresponding signal to the AND circuit 237. At the same time, the output signal from the MUX 231 is also supplied to the edge detection circuit 235. Since the mode selection signal 42 "1" is continuously input from the MPU 28 to the OR circuit 236 in the acquisition mode, the output signal from the phase error detection circuit 233 is input to the gain adjustment circuit 238 through the AND circuit 237 in the acquisition mode. In other words, the phase error of the clock signal is continuously detected based on the successive sampled values obtained at the upper peaks (the maximum values), the lower peaks (the minimum values), the rising edge portions, the falling edge portions, and the center points between the upper and lower peaks of the readout signal having the highest density. Therefore, the phase error is so frequently obtained that the phase of the clock signal can be adjusted more quickly. The output signal from the AND circuit 237 is adjusted to have the gain set to the Hi state (hereinafter a Hi gain) by the gain adjustment circuit 238, and is output therefrom as the phase error.

The signal output from the gain adjustment circuit 238 as the phase error is supplied to the DAC 240 shown in FIG. 2 via the AND circuit 239. The AND circuit 239 is controlled by a masking signal 46 output from the MPU 28, which will be described later. When a low-level masking signal is supplied to the AND circuit 239, the signal output from the gain adjustment circuit 238 as the phase error is masked and is not provided to the DAC 240.

On the other hand, in the tracking mode, the second sampled values S2 are input to the phase error detection circuit 233 as well as to the edge detection circuit 235 through the MUX 231. The phase error detection circuit 233 calculates the phase error of the clock signal from the second sampled values S2 in accordance with the predetermined calculation process, and outputs the corresponding signal to the AND circuit 237. The edge detection circuit 235 performs a predetermined edge detection process, which will be described later, on the second sampled values S2. The edge detection circuit 235 outputs an edge detection signal "1" when determining that the second sampled values S2 are sampled at edge portions of the readout signal, and, when not, outputs an edge detection signal "0". The detection signal is supplied to the OR circuit 236, to which the mode selection signal 42 "0", which indicates that the PED 230 is in the tracking mode, is input from the MPU 28. Therefore, when the edge detection signal "1" is supplied to the OR circuit 236, the output signal from the phase error detection circuit 233 passes through the AND circuit 237 and is output to the gain adjustment circuit 238. Thus, the phase error of only the edge portions of the readout signal is supplied to the gain adjustment circuit 238. The output signal from the AND circuit 237 is adjusted to have the gain set to the Low state (hereinafter a Low gain) by the gain adjustment circuit 238, and is output therefrom. The Low gain is smaller than the Hi gain.

By thus adjusting the gain with respect to the phase error calculated by the phase error detection circuit 233 in accordance with the gain setting signal 44 from the MPU 28, the phase of the clock signal can be adjusted so as to quickly shift close enough to its right phase in the acquisition mode and to be stable without oscillation in the tracking mode.

Figure 4:
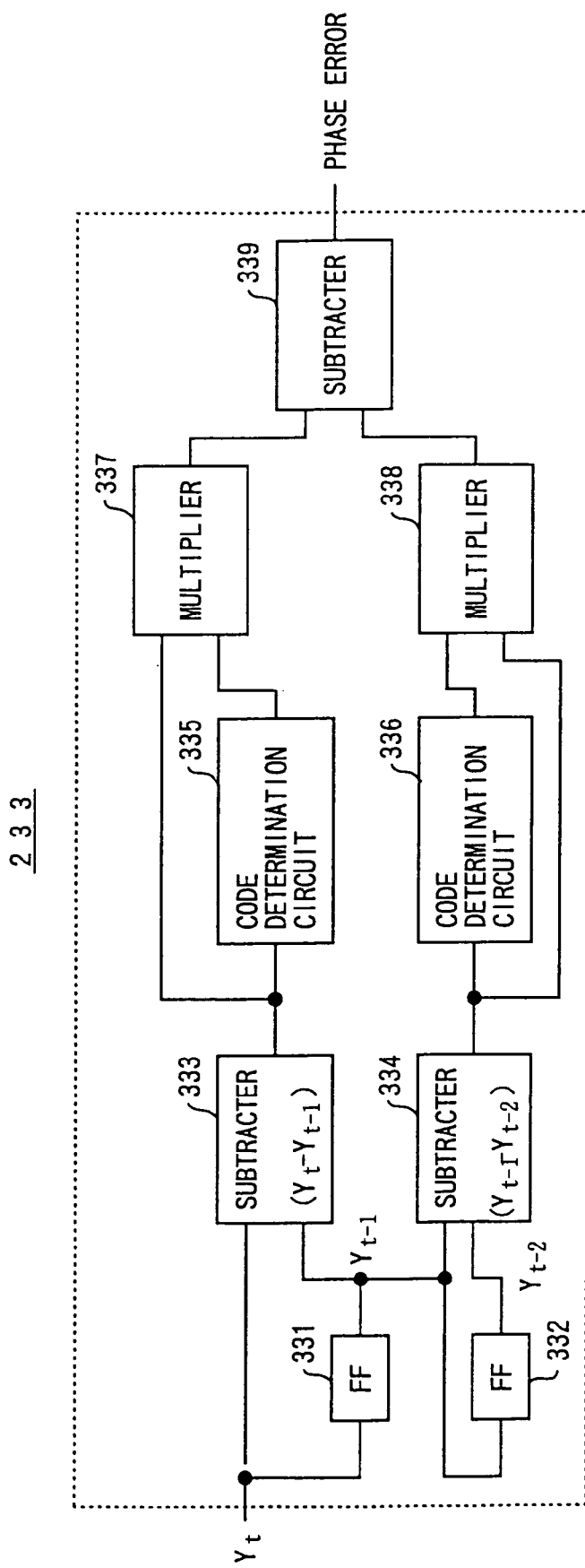
FIG. 4 is a block diagram showing a structure of a phase error detection circuit of the phase error detection unit of FIG. 3.

A description will now be given, with reference to the accompanying drawings, of the calculation of the phase error of the clock signal performed by the phase error detection circuit 233. FIG. 4 is a block diagram showing a structure of the phase error detection circuit 233.

Suppose in FIG. 4 that a first sampled value $Y_t$ at a sampling instant t, a second sampled value $Y_{t-1}$ at a sampling instant t-1, which is previous to the sampling instant t, and a third sampled value $Y_{t-2}$ at a sampling instant t-2, which is previous to the sampling instant t-1, are input in the order sampled to the phase error detection circuit 233.

The phase error detection circuit 233 includes flip-flops (FF) 331 and 332, subtracters 333, 334 and 339, code determination circuits 335 and 336, and multipliers 337 and 338. The sampled 331 and 332, respectively when the sample value $Y_t$ is detected at the sampling instant t.

The phase error detection circuit 233 calculates the phase error (PE) of the clock signal based on the following equation:

$$PE = (Y_t - Y_{t-1}) \times hat_{t,\ t-1} - (Y_{t-1} - Y_{t-2}) \times hat_{t-1, t-2}$$

where $hat_{t,\ t-1} = 1, 0, -1$ in the cases of $Y_t - Y_{t-1} > 0$, $Y_t - Y_{t-1} = 0$, $Y_t - Y_{t-1} < 0$, respectively, and $hat_{t-1,\ t-2} = 1, 0, -1$ in the cases of $Y_{t-1} - Y_{t-2} > 0$, $Y_{t-1} - Y_{t-2} = 0$, $Y_{t-1} - Y_{t-2} < 0$, respectively.

Since the waveform of the sampled readout signal has the upper and lower peaks, and the center points therebetween, the above equation is provided with a ternary code "hat" to correct the transition direction of the waveform so that the proper phase error can be detected at any of the above points.

The first sampled value $Y_t$ and the second sampled value $Y_{t-1}$ set in the FF 331 are input to the subtracter 333, which subtracts $Y_{t-1}$ from Yt to calculate a first difference. At the same time, the second sampled value $Y_{t-1}$ set in the FF 331 and the third sampled value Yt-2 set in the FF 332 are input to the subtracter 334, which subtracts $Y_{t-2}$ from $Y_{t-1}$ to calculate another first difference. The first difference calculated by the subtracter 333 is output to the code determination circuit 335. The code determination circuit 335 determines the ternary code for the first difference calculated by the subtracter 333, or determines $hat_{t,\ t-1}$, and outputs $hat_{t,\ t-1}$ to the multiplier 337. Simultaneously, the first difference calculated by the subtracter 334 is output to the code determination circuit 336. The code determination circuit 336 determines the ternary code for the first difference calculated by the subtracter 334, or determines $hat_{t-1,\ t-2}$, and outputs $hat_{t-1,\ t-2}$ to the multiplier 338. The product of $Y_t-Yt_{-1}$ $hat_{t,}hat_{t-1}$ calculated by the multiplier 337 and the product of $Y_{t-1}-Yt_{-2}$ and $hat_{t-1,t-2}$ calculated by the multiplier 338 are output to the subtracter 339. The subtracter 339 finally determines the phase error of the clock signal from the above equation. In other words, the subtracter 339 uses the absolute values of the two first differences, which are calculated by multiplying each of the two first differences by the ternary code "hat" to correct the transition direction, so as to calculate the difference between the two absolute values from the above equation (a second difference), which is equal to the phase error of the clock signal.

Figure 5:
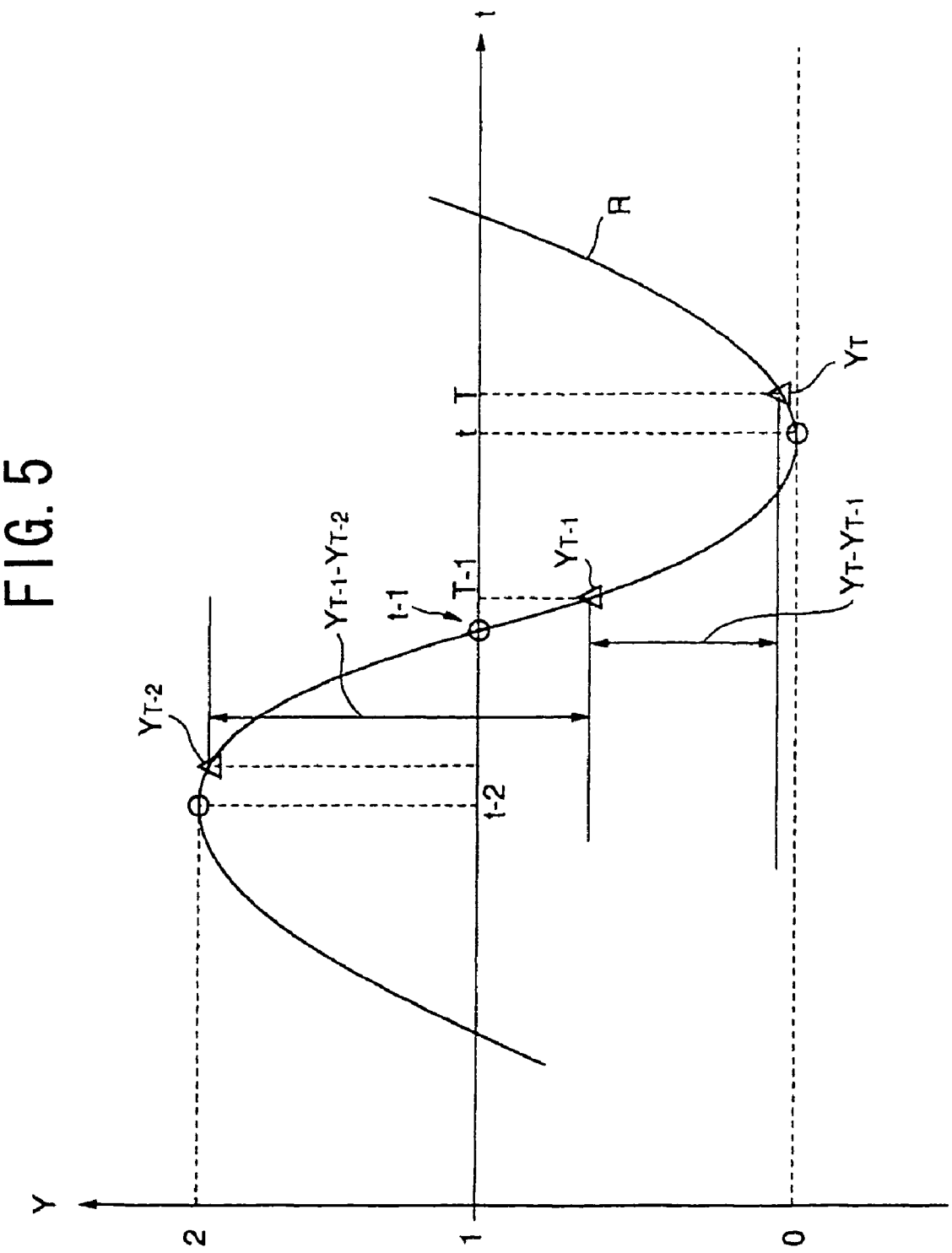
FIG. 5 is a diagram showing a waveform of a readout signal before being supplied to a Viterbi detection module so as to illustrate a phase error determined from an equation.

FIG. 5 shows a waveform of a readout signal R before being supplied to the Viterbi detection module 100 so as to illustrate the phase error determined from the above equation. The readout signal R is sampled in synchronism with the clock signal to provide sampled values Y. The ideal sampling of the readout signal R is performed by generating the clock signal at the sampling instants t, t-1 and t-2 corresponding to the lower peak, the center point and the upper peak, respectively, of the waveform, shown circled in FIG. 5. If the readout signal R is sampled at the ideal sampling instants t, t-1 and t-2, the phase error (PE) is given by the above formula as follows:

$$PE = (Y_t - Y_{t-1}) \times hat_{t,t-1} - (Y_{t-1} - Y_{t-2}) \times hat_{t-1\_t-2}$$
$$= (0 - 1) \times (-1) - (1 - 2) \times (-1)$$
$$= 0$$

Thus, it can be confirmed that there exists no phase error.

Next, a description will be given of a case where a phase error exists using FIG. 5. The sampling of the readout signal is performed by generating the clock signal at the sampling instants T, T-1 and T-2, which deviate from the lower peak, the center point and the upper peak, respectively. The waveform is marked with a triangle at each of the sampling instants T, T-1 and T-2.

Suppose that $Y_T=0.1$, $Y_{T-1}=0.7$ and $Y_{T-2}=1.9$, the phase error (PE) is given by the above equation as follows:

$$PE = (Y_t - Y_{t-1}) \times hat_{t,t-1} - (Y_{t-1} - Y_{t-2}) \times hat_{t-1,t-2}$$
$$= (0.1 - 0.7) \times (-1) - (0.7 - 1.9) \times (-1)$$
$$= 0.6 - 1.2$$
$$= -0.6$$

It is concluded from the above calculation result that the clock signal lags behind by the phase error of 0.6. Consequently, the phase of the clock signal is controlled so as to correct the above phase error. According to the above example, the phase error is calculated with respect to the falling edge portion including the center point. On the other hand, the phase error can also be calculated with respect to a rising edge portion including a center point, or to an edge portion including an upper or a lower peak. The first differences $Y_t-Y_{t-1}$ and $Y_{t-1}-Y_{t-2}$, that is, the differences between the real sampled values, are multiplied by the ternary codes $\hat{hat}_{t,\ t-1}$ and $\hat{hat}_{t-1,\ t-2}$, respectively, to correct the transition direction. As a result, the absolute values of the first differences are determined so that the phase error can correctly be calculated based on the first differences irrespective of the sampling instants at which the readout signal is sampled. The difference of the absolute values of the first differences is determined from the above equation as the second difference, which is employed as the phase error to control the phase compensation.

Figure 6:
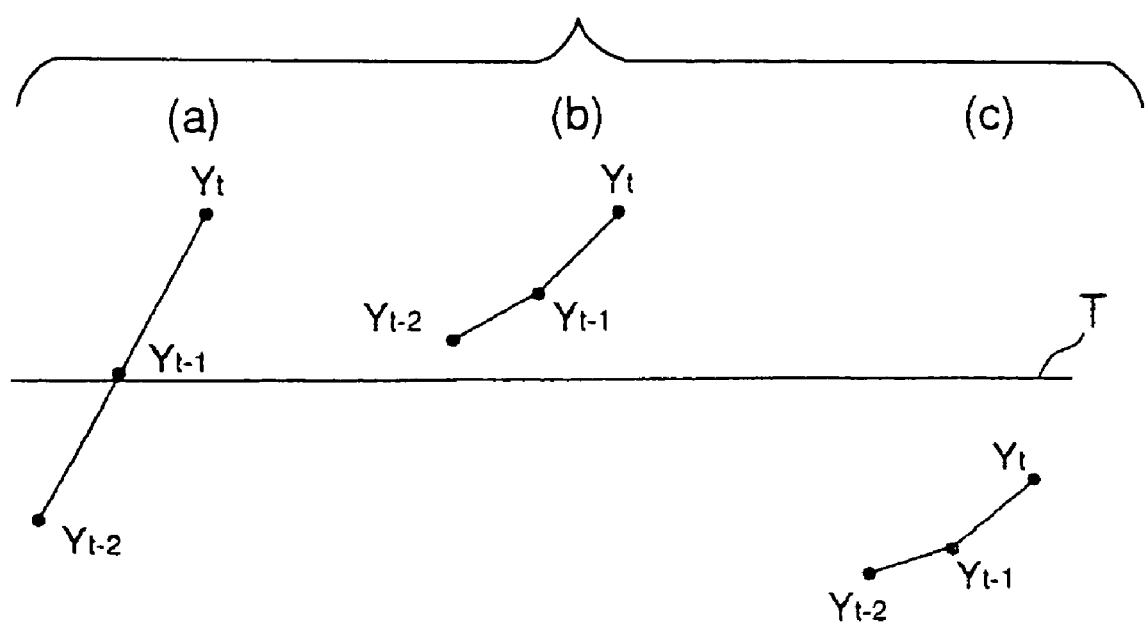
FIGS. 6(a, b, c) are a one diagram for illustrating a threshold define so as to prevent a wrong portion of the readout signal from being detected as an edge portion.
Figure 7:
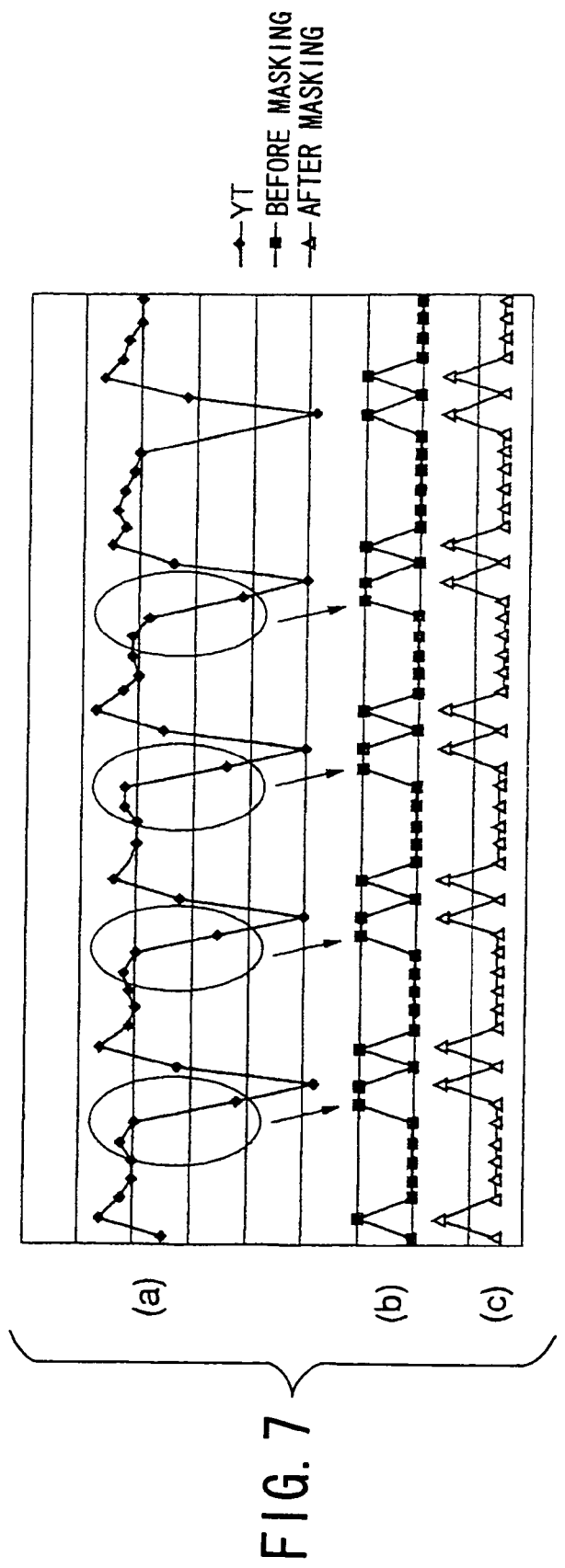
FIGS. 7(a, b, c) are a diagram for illustrating a masking threshold.

A description will now be given, with reference to FIGS. 6 through 8, of the edge detection in the tracking mode performed by the edge detection circuit 235. The edge detection is provided in order to prevent the phase of the clock signal from shifting from that of the readout signal at the edge portions thereof when the readout signal is reproduced from a storage medium which is likely to cause the distortion of the waveform of the readout signal at the edge portions thereof. The edge detection circuit 235 detects the rising edge portions or the falling edge portions based on the sampled values obtained in the order sampled. Just as previously described, suppose that the first, second and third sampled values $Y_t$, $Y_{t-1}$ and $Y_{t-2}$ are obtained at the sampling instants t, t-1 and t-2, respectively. The conditions for detecting the rising edge portions are established as $Y_{t-1}-Y_{t-2}>0$ and $Y_t-Y_{t-1}>0$.

Since the readout signal sampled in the tracking mode is a data signal, a wrong portion of the readout signal may be detected as an edge portion because of the variation in the recorded data thereof. Therefore, it is preferable to define a threshold T so as to prevent a wrong portion of the readout signal from being detected as an edge portion. In the case of the rising edge portions, the detection of a wrong portion can be precluded by setting the following conditions: the third sampled value $Y_{t-2}$ is smaller than the threshold T ($Y_{t-2}<T$) and the first sampled value $Y_t$ is larger than the threshold T ($Y_t>T$). Under these conditions, FIG. 6(a) is detected as a rising edge portion, while FIG. 6(b) and (c) are not. The threshold T is defined, for example, by a control signal from the MPU 28 serving as a threshold defining circuit. The MPU 28 suitably defines the threshold T depending-on a type of storage medium. By thus setting the conditions, the rising edge portions of the readout signal can be detected based on a series of discrete but successive sampled values in ascending order from a value smaller than the threshold T to a value larger than the threshold T.

Similarly, the conditions for preventing the detection of a wrong portion can be established with respect to the falling edge portions. In the case of the falling edge portions, the conditions are opposite to those in the case of the rising edge portions. In other words, the conditions are set as follows: $Y_{t-1}-Y_{t-2}<0$ and $Y_t-Y_{t-1}<0$, and the third sampled value $Y_{t-2}$ is larger than the threshold T ($Y_{t-2}>T$) and the first sampled value $Y_t$ is smaller than the threshold T ($Y_t<T$).

Further, an asymmetric waveform should be considered in the case of detecting edge portions of a data signal. For example, a waveform of sampled values of a data signal shown in FIG. 7(a) includes oval-circled portions each including three successive sampled values. In this case, each of the oval-circled portions can be detected as a falling edge portion based on the above conditions for preventing the wrong detection. If detected in this way, pairs of successive falling edge portions are indicated in a waveform indicating the edge portions of the data signal as shown in FIG. 7(b). In order to prevent this, it is preferable to perform a masking where a difference between two successive sampled values is masked if the absolute value thereof is smaller than a given value (defined as a masking threshold mT). The masking threshold mT can be defined, for example, based on a control signal from the MPU 28.

A preferred waveform indicating the edge portions of the data signal as shown in FIG. 7(c) is obtained by masking the first difference $Y_{t-1}-Y_{t-2}$ if $|Y_{t-1}-Y_{t-2}|<mT$ or the first difference $Y_t-Y_{t-1}$ if $|Y_t-Y_{t-1}|<mT$.

The threshold T is normally a fixed value defined by the MPU 28. In some cases, a data signal is offset in its amplitude direction by the envelope variation thereof caused by the eccentricity of a disk-shaped storage medium. Therefore, it is preferable to perform the edge detection by adding to the threshold T an estimated offset of the data signal caused by the envelope variation thereof or the like. In other words, it is desirable to add, by an adder, the offset estimated by an offset estimation circuit to the threshold T and input the adding result thereof to the edge detection circuit 235. Thereby, the envelope variation of the data signal can be considered in the edge detection, and the threshold T is corrected in accordance with the offset and can be maintained at the best level for the edge detection.

Figure 8:
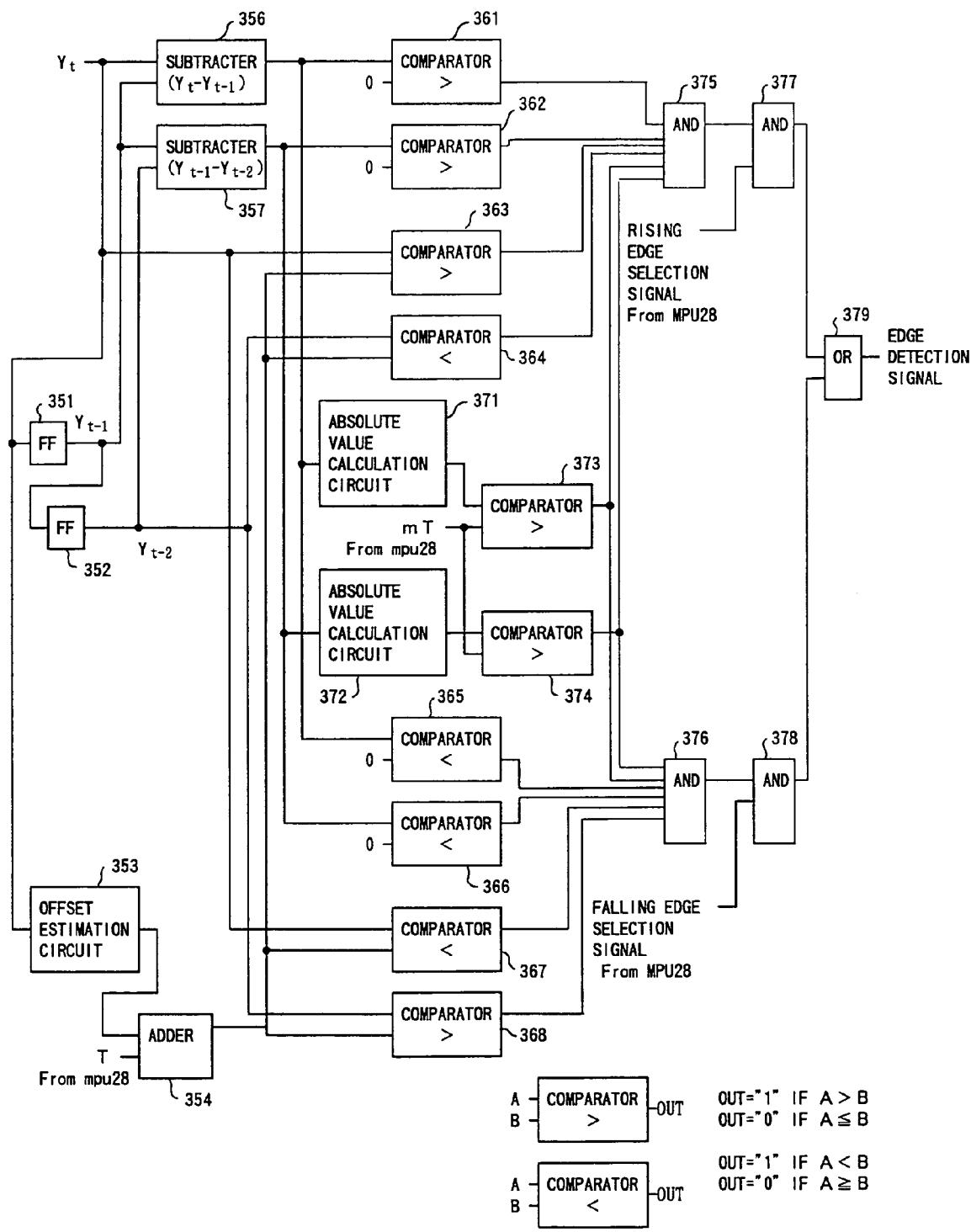
FIG. 8 is a block diagram showing a structure of an edge detection circuit of the phase error detection unit of FIG. 3.

FIG. 8 shows a structure of the edge detection circuit 235, wherein the threshold T and the masking threshold mT are defined with the offset being considered.

According to FIG. 8, the edge detection circuit 235 includes flip-flops (FF) 351 and 352, an offset estimation circuit 353, an adder 354, and subtracters 356 and 357. The sampled values $Y_{t-1}$ and $Y_{t-2}$ are simultaneously set in the FFs 351 and 352, respectively when the sampled value $Y_t$ is detected at the sampling instant t. The edge detection circuit 235 further includes comparators 361 through 364 and AND circuits 375 and 377 for detecting a rising edge portion, absolute value calculation circuits 371 and 372, comparators 373 and 374, and comparators 365 through 368 and AND circuits 376 and 378 for detecting a falling edge portion.

A description will now be given of the detection of the rising edge portions. The detection of the falling edge portions is performed in the same process as the detection of the rising edge portions by reversing almost all the conditions for the detection of the rising edge portions. Therefore, a detailed description thereof will be omitted.

First, the first sampled value $Y_t$ and the second sampled value $Y_{t-1}$ set in the FF 351 are input to the subtracter 356, and at the same time, the second sampled value $Y_{t-1}$ set in the FF 351 and the third sampled value $Y_{t-2}$ set in the FF 352 are input to the subtracter 357. The calculation result by the subtracter 356 is output to the comparator 361, which determines whether $Y_t-Y_{t-1}>0$. If $Y_t-Y_{t-1}>0$, a value "1" is output to the AND circuit 375. If $Y_t-Y_{t-1}\leq 0$, a value "0" is output to the AND circuit 375. Simultaneously, the calculation result of the subtracter 357 is output to the comparator 362, which determines whether $Y_{t-1}-Y_{t-2}>0$. If $Y_{t-1}-Y_{t-2}>0$, the value "1" is output to the AND circuit 375. If $Y_{t-1}-Y_{t-2}\leq 0$, the value "0" is output to the AND circuit 375. That is, a portion of the data signal including the above sampled values is detected as a probable rising edge portion when both of the comparators 361 and 362 output the values "1" to the AND circuit 375.

Next, it is determined whether the first and third sampled values $Y_t$ and $Y_{t-2}$ are above and below the threshold T defined by the MPU 28, respectively. The first sampled value $Y_t$ and the threshold T defined by the MPU 28 are input to the comparator 363. At this point, if the data signal has an offset, the threshold T defined by the MPU 28 is corrected by adding, by the adder 354, the offset estimated by the offset estimation circuit 353 thereto and the corrected threshold T is input to the comparator 363. The comparator 363 compares the first sampled value $Y_t$ and the threshold T. The comparator 363 outputs the value "1" to the AND circuit 375 if $Y_t>T$ and the value "0" if $Y_t<T$.

At the same time, the comparator 364 compares the third sampled value $Y_{t-2}$ and the threshold T. The comparator 364 outputs the value "1" to the AND circuit 375 if $Y_{t-2}<T$ and the value "0" if $Y_{t-2}>T$. That is, the portion of the data signal including the above-mentioned sampled values is detected as a probable rising edge portion when both of the comparators 363 and 364 output the values "1" to the AND circuit 375.

Next, a decision is made on the necessity of the masking based on the masking threshold mT defined by the MPU 28. The calculation result of the subtracter 356 is also input to the absolute value calculation circuit 371. The absolute value $|Y_t-Y_{t-1}|$ calculated by the absolute value calculation circuit 371 and the masking threshold mT defined by the MPU 28 are input to the comparator 373. The comparator 373 compares $|Y_t-Y_{t-1}|$ and the masking threshold mT. The comparator 373 outputs the value "1" to the AND circuit 375 if $|Y_t-Y_{t-1}|>mT$ and the value "0" if $|Y_t-Y_{t-1}|\leq mT$. Therefore, if $|Y_t-Y_{t-1}|\leq mT$, the first difference $Y_t-Y_{t-1}$ is masked and the portion of the data signal including the above-mentioned sampled values is not detected as a rising edge portion. Simultaneously, the calculation result of the subtracter 357 is also input to the absolute value calculation circuit 372. The absolute value $|Y_{t-1}-Y_{t-2}|$ calculated by the absolute value calculation circuit 372 and the masking threshold mT defined by the MPU 28 are input to the comparator 374. The comparator 374 compares $|Y_{t-1}-Y_{t-2}|$ and the masking threshold mT. The comparator 374 outputs the value "1" to the AND circuit 375 if $|Y_{t-1}-Y_{t-2}|>mT$ and the value "0" if $|Y_{t-1}-Y_{t-2}|\leq mT$. Therefore, if $|Y_{t-1}-Y_{t-2}|\leq mT$, the first difference $Y_{t-1}-Y_{t-2}$ is masked and the portion of the data signal including the above-mentioned sampled values is not detected as a rising edge portion.

The AND circuit 375, to which the above input signals are transmitted, outputs the value "1" to the AND circuit 377 only when all the input signals are the value "1", which indicates that the portion of the data signal including the above-mentioned sampled values is detected as a rising edge portion. In the case of selecting a rising edge portion, the MPU 28 supplies a rising edge selection signal "1" to the AND circuit 377, which outputs a corresponding signal to an OR circuit 379.

The detection of the falling edge portions proceeds similarly through the comparators 365 through 368, the absolute value calculation circuits 371 and 372, the comparators 373 and 374, and the AND circuit 376. In the case of selecting a falling edge portion, the MPU 28 supplies a falling edge selection signal "1" to the AND circuit 378, which outputs a corresponding signal to the OR circuit 379. Therefore, when a rising or a falling edge portion is detected, the OR circuit outputs the edge detection signal. In other words, the edge detection circuit 235 shown in FIG. 3 outputs the edge detection signal "1" to the OR circuit 236.

Figure 9:
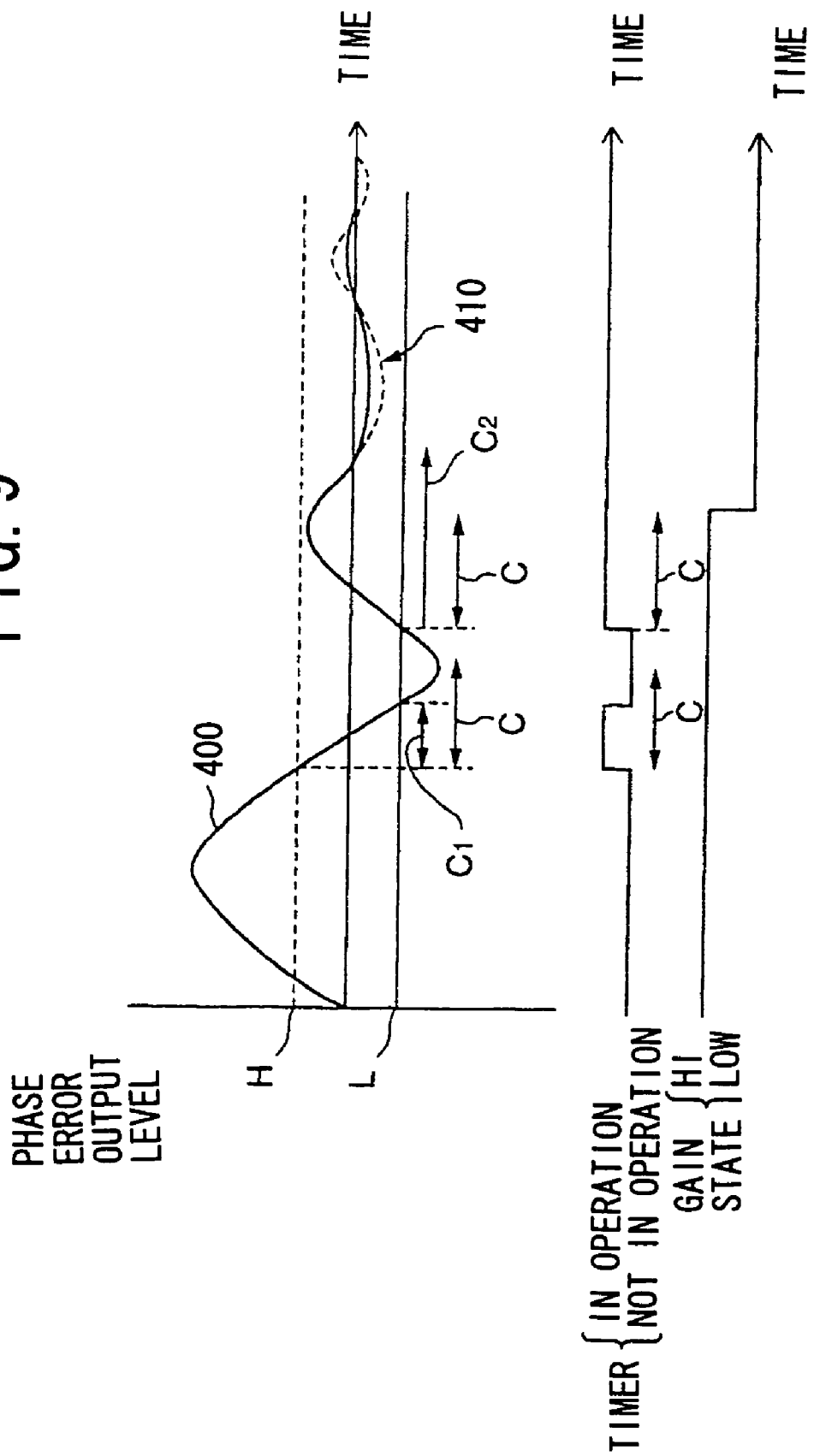
FIG. 9 is a diagram showing a convergence process of the phase error of a clock signal according to the present embodiment.

FIG. 9 shows a convergence process of the phase error of the clock signal according to the present embodiment. A waveform 400 indicates the output level of the phase error. The MPU 28 determines a timing for switching the acquisition and tracking modes by making a judgment on the state of convergence of the phase error of the clock signal. The timing can be determined depending on the characteristic of a storage medium by the MPU 28 serving as a convergence time setting circuit. The convergence of the phase error is determined when the amplitude of a detected phase error output remains within a predetermined range for a predetermined period of time, namely, for a longer period than a predetermined reference time length set by the MPU 28. The MPU 28 functioning as a convergence range setting circuit can also set the predetermined range. The acquisition mode can smoothly be switched to the tracking mode after it is determined that the phase error converges within the predetermined range according to the above judgment on the convergence state thereof.

As the MPU 28 can make the above judgment on the convergence state of the phase error, the MPU 28 can automatically switch the acquisition mode to the tracking mode by outputting the mode selection signal 42 to the OR circuit 236 when the convergence of the phase error within the predetermined range is determined. Further, the gain setting signal 44 input to the gain adjustment circuit 238 from the MPU 28 can be set so as to automatically switch the state of the gain from Hi to Low, simultaneously with the above-mentioned mode switching, after the convergence of the phase error within the predetermined range is confirmed. A dotted waveform 410 in FIG. 9 shows a waveform which the phase error takes if the gain is maintained in the original state, that is, the Hi state, without being switched to the Low state. As can be seen from the comparison between the waveform 400 and the dotted waveform 410, the range of the amplitude of the phase error narrows faster with the Low gain than the Hi gain after the convergence of the phase error within the predetermined range is determined.

In FIG. 9, the predetermined range of the amplitude of the phase error is set between a first output level H and a second output level L. When the amplitude of the phase error detected by the phase error detection circuit 233 falls within the above-mentioned predetermined range, a timer operation is started to count the time length required for the phase error to shift between the first and second output levels H and L. When the time length is shorter than a reference time length, the mode switching does not occur. On the other hand, when the time length is longer than the reference time length, the mode switching occurs. For example, in the case of a time length C1 in FIG. 9, which is shorter than a predetermined reference time length C, the mode switching does not occur and the acquisition mode is maintained. On the other hand, in the case of a time length C2, which is longer than the predetermined reference time length C, the mode is switched from the acquisition mode to the tracking mode and the state of the gain is switched from Hi to Low when the time length for which the phase error remains between the first and second output levels H and L becomes longer than the reference time length C. Thereafter, the tracking mode is maintained. As previously described, when the amplitude of the phase error of the clock signal remains within the predetermined range for the predetermined period of time in the acquisition mode, the convergence of the phase error is determined, that is, it is determined that the phase of the clock signal shifts close enough to its right phase. Then, the tracking mode begins and the phase of the clock signal is adjusted based on the sampled values of the readout signal obtained at the edge portions thereof, so that the phase thereof is prevented from getting out of a predetermined range in the tracking mode.

Figure 10:
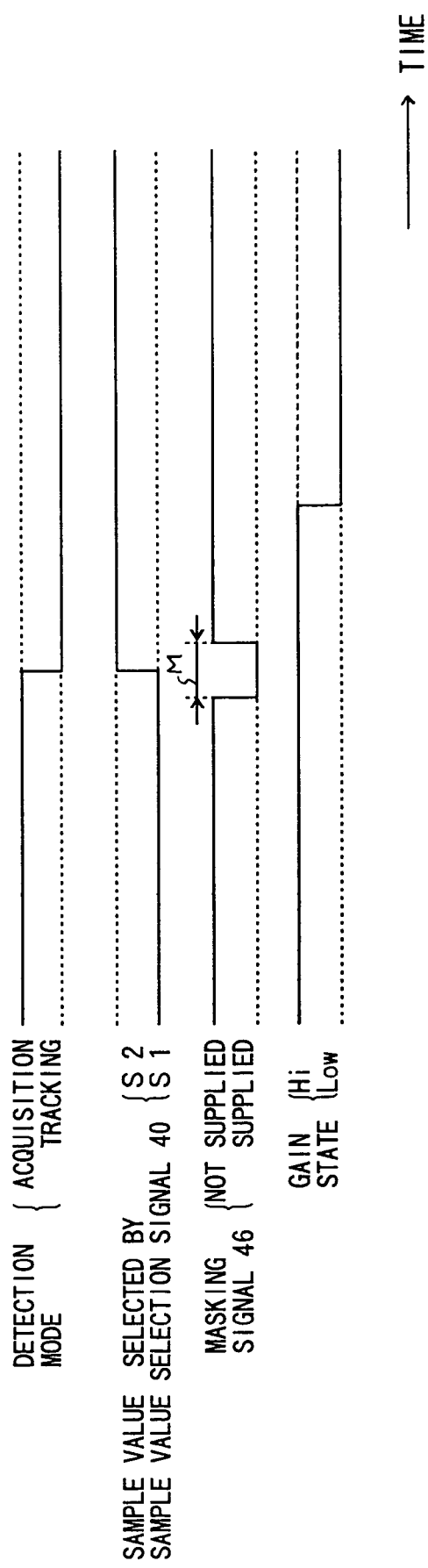
FIG. 10 is a timing chart illustrating a switching of sampled values of the readout signal employed to detect the phase error.

FIG. 10 illustrates the switching of the sampled values of the readout signal employed to detect the phase error from the first sampled values S1 to the second sampled values S2. As previously described, the first sampled values S1 output from the ADC 23 are employed to calculate the phase error in the acquisition mode, while the second sampled values S2 output from the EQ 24 are employed in the tracking mode. Although the second sampled values S2 may be employed both in the acquisition and tracking modes, it is desirable to employ the first sampled values S1 in the acquisition mode to quickly adjust the phase of the clock signal. By thus selectively employing the two types of the sampled values S1 and S2 before going through the Viterbi detection circuit 100, the phase of the clock signal can efficiently be controlled with respect to the real sampled values obtained through the PRML method.

However, the first and second sampled values S1 and S2 are employed in parallel with each other to calculate the phase error at one point during the mode switching from the acquisition mode to the tracking mode, due to a delay in outputting the sampled values S2 resulting from the waveform equalization thereon by the EQ 24. As previously described, the sampling conditions of the acquisition and tracking modes differ considerably from each other. Therefore, if the phase error output during the mode switching is employed, the phase of the clock signal may wrongly be adjusted. Hence, according to the present embodiment, the phase error output is masked by the masking signal 46 for a predetermined period of time when the first sampled values S1 are switched to the second sampled values S2. Therefore, the adverse effect of the above delay resulting from the waveform equalization can be eliminated, and the phase of the clock signal is prevented from being wrongly adjusted. According to FIG. 10, the phase error output is masked for a period M, during which the masking signal 46 is supplied. More specifically, the masking signal 46 is supplied from the MPU 28 to the AND circuit 239 shown in FIG. 3 as a gate control signal.

As previously described, the sampled value selection signal 40 switching the sampled value S1 to the sampled value S2 is output from the MPU 28. As shown in FIG. 10, the gain state may be switched from Hi to Low when a certain period of time passes after the switching of the sampled values.

Figure 11:
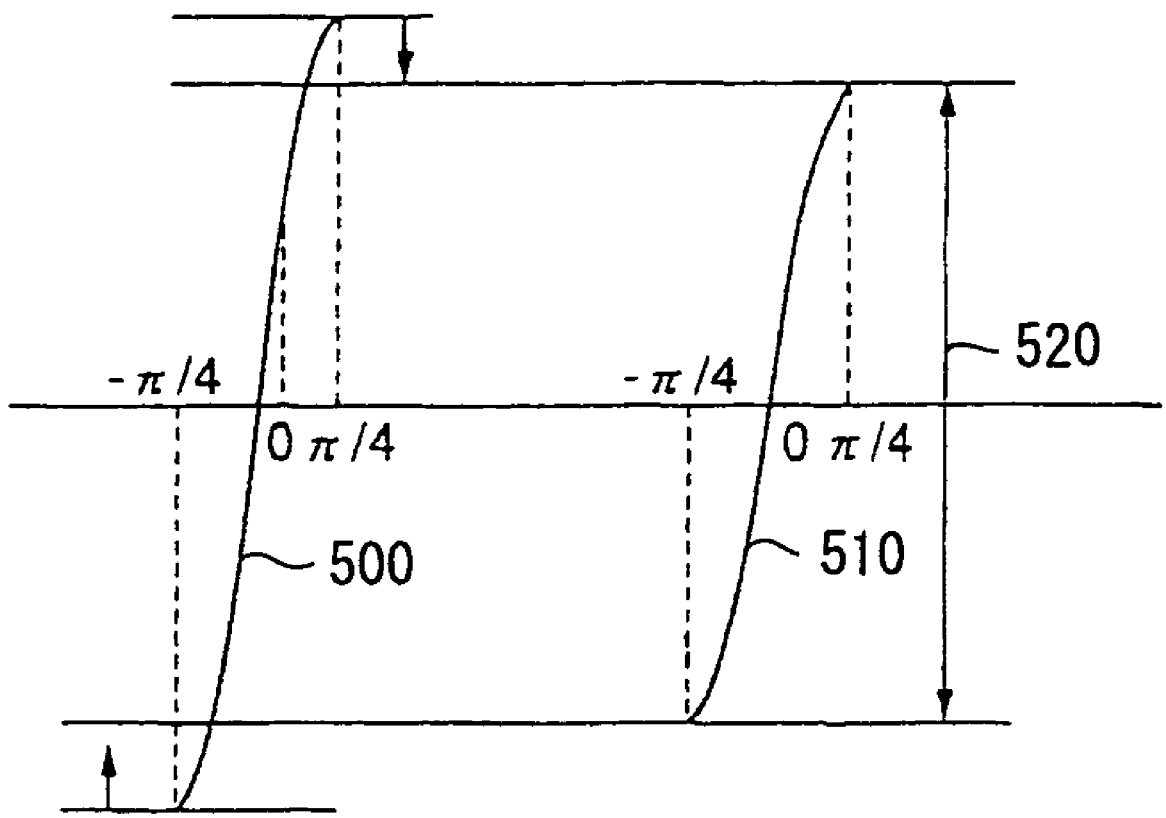
FIG. 11 is a diagram illustrating normalization of a phase error output.

FIG. 11 is a diagram illustrating the normalization of the phase error output. It is desirable to set the gain based on the upper peak (the maximum value) or the lower peak (the minimum value) of the readout signal obtained at the end of the acquisition mode, namely, the amplitude of the readout signal, so that a gain KΦ in the transfer function of the clock generation circuit 200 remains constant. By thus adjusting the gain so that the peak-to-peak value of the amplitude of the phase error output remains constant, the readout signal having different amplitudes can be processed without changing the constant of an integrator. The above gain adjustment process is performed by the gain adjustment circuit 238 shown in FIG. 3. In FIG. 11, by being subjected to the above-mentioned gain adjustment process, the peak values of amplitude 500 of the phase error output are reduced to those of amplitude 510 thereof, of which the peak-to-peak value is equal to a predetermined constant peak-to-peak value 520.

The present invention is not limited to the specifically disclosed embodiment, and variations and modifications may be made without departing from the scope of the present invention.

For example, according to the present embodiment, the present invention is applied to the magneto-optical disk as the recording medium. However, the present invention is not limited thereto, and may be applied to any medium from which a signal can be optically read out and to an apparatus having a data reproduction system therefor.

The present application is based on Japanese priority application No. 11-361550 filed on Dec. 20, 1999, the entire contents of which are hereby incorporated by reference.

What is claimed is:

1. A clock adjustment apparatus for adjusting a phase of a clock signal in a data reproduction system which samples a readout signal from a recording medium in synchronism with the clock signal and reproduces data in accordance with a Viterbi algorithm by using sampled values of the readout signal, said recording medium being recorded with the data modulated in accordance with a recording rule of a predetermined partial response characteristic, said clock adjustment apparatus comprising:
    a phase error calculation circuit configured to calculate a phase error of the clock signal based on a difference between first and second sampled values and a difference between second and third sampled values of consecutive first, second and third sampled values of the readout signal; and
    an adjusting circuit configured to adjust the phase of the clock signal based on the phase error thereof.

2. The clock adjustment apparatus as claimed in claim 1, wherein said phase error calculation circuit calculates the phase error based on a difference between an absolute value of a difference between the first and second sampled values and an absolute value of a difference between the second and third sampled values.

3. The clock adjustment apparatus as claimed in claim 1, wherein said phase error calculation circuit continuously calculates the phase error based on all of successive sampled values in an acquisition mode of the clock adjustment apparatus in which pattern data having a highest density is reproduced.

4. The clock adjustment apparatus as claimed in claim 1, further comprising:
    an edge detection circuit configured to detect an edge portion of the readout signal based on the transition state of the sampled values of the readout signal,
    wherein said phase error calculation circuit calculates the phase error of the clock signal based on sampled values of the edge portion of the readout signal detected by said edge detection circuit.

5. The clock adjustment apparatus as claimed in claim 4, wherein:
    said edge detection circuit comprises a rising edge detection circuit configured to detect a rising edge portion of the readout signal; and
    said phase error calculation circuit calculates the phase error of the clock signal based on sampled values of the rising edge portion of the readout signal detected by said rising edge detection circuit.

6. The clock adjustment apparatus as claimed in claim 4, wherein:
    said edge detection circuit comprises a falling edge detection circuit configured to detect a falling edge portion of the readout signal; and
    said phase error calculation circuit calculates the phase error of the clock signal based on sampled values of the falling edge portion of the readout signal detected by said falling edge detection circuit.

7. The clock adjustment apparatus as claimed in claim 4, wherein said edge detection circuit detects a portion of the readout signal as the edge portion when the portion comprises a series of successive sampled values in ascending order from a value smaller than a predetermined threshold value to a value larger than the predetermined threshold value, or when the portion comprises a series of successive sampled values in descending order from a value larger than a predetermined threshold value to a value smaller than the predetermined threshold value.

8. The clock adjustment apparatus as claimed in claim 7, wherein said edge detection circuit detects the portion of the readout signal as the edge portion when the portion comprises first, second and a third sampled values in an order sampled with the predetermined threshold value being between the first and third sampled values, and a sign of a difference between the first and second sampled values being identical to that of a difference between the second and third sampled values.

9. The clock adjustment apparatus as claimed in claim 7, wherein said edge detection circuit comprises:
an offset estimation circuit configured to estimate an offset of the readout signal caused by an envelope variation thereof; and
a circuit configured to correct the predetermined threshold value in accordance with the offset estimated by said offset estimation circuit.

10. The clock adjustment apparatus as claimed in claim 7, further comprising:
a threshold defining circuit configured to define the predetermined threshold value.

11. The clock adjustment apparatus as claimed in claim 4, wherein:
said phase error calculation circuit operates in an acquisition mode of the clock adjustment apparatus in which the phase error of the clock signal is continuously calculated based on all of successive sampled values of the readout signal and in a tracking mode of the clock adjustment apparatus in which the phase error is calculated based on the sampled values of the edge portion of the readout signal detected by said edge detection circuit, and
said clock adjustment apparatus further comprises an operation mode switching circuit configured to switch an operation mode of said phase error calculation circuit from the acquisition mode to the tracking mode when an amplitude of the phase error calculated by said phase error calculation circuit remains within a predetermined range for a predetermined period of time in the acquisition mode.

12. The clock adjustment apparatus as claimed in claim 11, wherein said operation mode switching circuit comprises a convergence time setting circuit which sets the predetermined period of time which is used as a reference when switching the operation mode of the clock adjustment apparatus.

13. The clock adjustment apparatus as claimed in claim 11, wherein said operation mode switching circuit comprises a convergence range setting circuit which sets the predetermined range which is used as a reference when switching the operation mode of the clock adjustment apparatus.

14. The clock adjustment apparatus as claimed in claim 11, wherein:
said phase error calculation circuit comprises a gain adjustment circuit configured to adjust a gain according to the phase error of the clock signal calculated thereby, so as to adjust the phase of the clock signal using the adjusted gain, and
said clock adjustment apparatus further comprises a gain switching circuit configured to set a first gain with respect to said gain adjustment circuit when said phase error calculation circuit operates in the acquisition mode and to set a second gain, which is smaller than the first gain, with respect to said gain adjustment circuit when said phase error calculation circuit operates in the tracking mode.

15. The clock adjustment apparatus as claimed in claim 11, wherein:
said data reproduction system comprises an equalizer which performs a waveform equalization on the sampled values of the readout signal; and
said phase error calculation circuit, in the tracking mode, calculates the phase error of the clock signal based on a transition state of the sampled values on which the waveform equalization has been performed by said equalizer.

16. The clock adjustment apparatus as claimed in claim 15, further comprising:
a circuit configured to prevent the phase error calculated by said phase error calculation circuit from being used to adjust the phase of the clock signal during a predetermined period of time before and after the sampled values to be used by said phase error calculation circuit to calculate the phase error switch to the sampled values subjected to the waveform equalization by said equalizer.

17. The clock adjustment apparatus as claimed in claim 1, further comprising:
a normalization circuit configured to normalize the phase error of the clock signal calculated by said phase error calculation circuit so that a transfer function of a feedback loop for adjusting the phase of the clock signal remains constant.

18. A clock adjustment apparatus for adjusting a phase of a clock signal in a data reproduction system which samples a readout signal from a recording medium in synchronism with the clock signal, and reproduces data in accordance with a Viterbi algorithm by using sampled values of the readout signal, said recording medium being recorded with the data modulated in accordance with a recording rule of a predetermined partial response characteristic, said clock adjustment apparatus comprising:
a phase error calculation circuit configured to calculate a phase error of the clock signal based on a difference between an absolute value of a difference between first and second sampled values and an absolute value of a difference between the second sampled value and a third sampled value before undergoing the Viterbi algorithm; and
an adjusting circuit configured to adjust the phase of the clock signal based on the phase error thereof.

19. An apparatus comprising:
a data reproduction system configured to sample a readout signal from a recording medium in synchronism with a clock signal, and to reproduce data in accordance with a Viterbi algorithm by using sampled values of the readout signal, said recording medium being recorded with the data modulated in accordance with a recording rule of a predetermined partial response characteristic,
said data reproduction system comprising a clock adjustment circuit configured to calculate a phase error of the clock signal based on a difference between first and second sampled values and a difference between second and third sampled values of consecutive first, second and third sampled values of the readout signal, and to adjust a phase of the clock signal based on the phase error.

20. The apparatus as claimed in claim 19, wherein the recording medium comprises an optical disk.

* * * * *